April 7, 1936.        G. CALSOW        2,036,457
PHOTOELECTRIC CELL
Filed Oct. 17, 1932
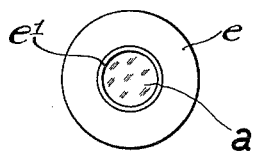
Inventor:
Georg Calsow Patented Apr. 7, 1936

2,036,457

UNITED STATES PATENT OFFICE 2,036,457

PHOTOELECTRIC CELL

Georg Calsow, Jena, Germany, assignor to the firm Carl Zeiss, Jena, Germany

Application October 17, 1932, Serial No. 638,142
In Germany October 20, 1931

2 Claims. (Cl. 201—63)

Application has been filed in Germany, October 20, 1931.

The present invention refers to resistances sensitive to light of the kind in which the exposure is at right angles to the direction of the current. Such resistances, or cells, are frequently applied in connexion with ray filters, which are utilized for instance for neutralizing in light-sign receivers the effect of the day-light upon the cells or for protecting the cells from rays that may unfavourably influence their life. In most cases, use has been made of glass or gelatine filters or of filters of vulcanized india-rubber and the like, the filters being connected to the cell itself or to the mount of an optical system generally employed for imaging the ray source on the cell.

In the case of the cell having a support permeable to rays that holds the light sensitive material through which the radiation takes place, the invention provides that this support represents the said filter itself. Not only does this offer the advantage that the cell is protected from undesired rays under any circumstances, even when not yet mounted in the receiver (and this without the possibility of an inadvertent omission of mounting the filter), but this advantage is attained with the simplest construction possible of the cell. Another advantage is presented by the fact that dispensing with two reflecting surfaces entails a recovery of light which is not negligible (8% approximately).

The material used for the new filter is chiefly glass. Glasses of suitable color, sufficient transparency and permeability to rays of great wavelengths may be had in the trade. Glass has proved to be suitable not only for making filters of most different kinds of absorption but also for being applied at the same time as a support for the electrodes and the material sensitive to light.

In the accompanying drawing, which illustrates a constructional example of the invention, Figure 1 represents a cross-sectional and Figure 2 a plan view of a thallium-sulphide cell. This cell has a glass filter $a$ permitting the passage substantially only of red and infra-red rays. The filter $a$ is a support for a layer $b$ of thallium-sulphide on which electrodes $c$ and $d$ are provided. The support $a$, the layer $b$ and the electrodes $c$ and $d$ are disposed in a housing $e$ of artificial resin, which has an aperture $e^1$ for the entrance of light. As is obvious from the drawing, current traversing the layer $b$ flows between electrodes $c$ and $d$ and parallel to the support $a$ or, in other words, at right angles to the direction in which the light rays enter.

I claim:

1. In a resistance sensitive to light, a coloured glass plate permeable to light rays illuminating this resistance, and a layer, this layer being sensitive to light and provided on the said glass plate, and this glass plate lying in the path of the light rays in front of the said layer.

2. In a resistance sensitive to light, a coloured glass plate permeable to light rays illuminating this resistance, and a layer, this layer being sensitive at least to long-wave rays and provided on the said glass plate, and this glass plate lying in the path of the light rays in front of the said layer.

GEORG CALSOW.